US010311013B2

(12) United States Patent
Lee et al.

(10) Patent No.: US 10,311,013 B2
(45) Date of Patent: Jun. 4, 2019

(54) HIGH-SPEED INTER-PROCESSOR COMMUNICATIONS

(71) Applicant: Facebook, Inc., Menlo Park, CA (US)

(72) Inventors: Kevin Desmond Lee, Mountain View, CA (US); Jia Ning, Newark, CA (US); Narsing Vijayrao, Santa Clara, CA (US); Koh Yew Thoon, Singapore (SG)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/650,730

(22) Filed: Jul. 14, 2017

(65) Prior Publication Data

US 2019/0018820 A1 Jan. 17, 2019

(51) Int. Cl.
*G06F 15/16* (2006.01)
*G06F 15/17* (2006.01)
*G06F 15/173* (2006.01)

(52) U.S. Cl.
CPC ............ *G06F 15/17* (2013.01); *G06F 15/161* (2013.01); *G06F 15/173* (2013.01)

(58) Field of Classification Search
CPC . G06F 13/4291; G06F 13/4022; G06F 13/402
USPC .................................. 710/100, 301, 316, 302
See application file for complete search history.

(56) References Cited

U.S. PATENT DOCUMENTS

| | | | | |
|---|---|---|---|---|
| 7,412,554 B2* | 8/2008 | Danilak | .................... | G06T 1/20 710/305 |
| 7,525,548 B2* | 4/2009 | Azar | ........................ | G06F 3/14 345/502 |
| 7,616,206 B1* | 11/2009 | Danilak | .................. | G06F 15/16 345/505 |
| 7,619,629 B1* | 11/2009 | Danilak | ................ | G06F 15/167 345/502 |
| 7,782,325 B2* | 8/2010 | Gonzalez | .............. | G06F 3/1438 345/505 |
| 8,066,515 B2* | 11/2011 | Johnson | .................. | G06F 1/184 439/61 |
| 8,373,709 B2* | 2/2013 | Solki | ........................ | G06F 3/14 345/502 |
| 8,892,804 B2* | 11/2014 | Morein | ............... | G06F 13/4031 710/306 |
| 9,235,013 B1* | 1/2016 | Chan | .................... | G02B 6/3893 |
| 10,009,270 B1* | 6/2018 | Stark | ..................... | H04L 45/745 |
| 2006/0098020 A1* | 5/2006 | Shen | ................... | G06F 13/4291 345/520 |
| 2006/0267993 A1* | 11/2006 | Hunkins | ................... | G06F 3/14 345/502 |
| 2007/0139422 A1* | 6/2007 | Kong | ..................... | G09G 5/363 345/502 |
| 2012/0233368 A1* | 9/2012 | Alshinnawi | ........... | G06F 13/128 710/301 |

(Continued)

*Primary Examiner* — Faisal M Zaman
(74) *Attorney, Agent, or Firm* — FisherBroyles, LLP

(57) ABSTRACT

A computing device has a motherboard, at least two daughter boards communicably connected to the motherboard, each of the at least two daughter boards having at least a specialized processor and a high-speed inter-processor communications port; and at least two high-speed inter-processor communication interconnects connecting at least two of the high-speed inter-processor communications ports. The configuration enables a flexible topology architecture, e.g., for different applications, and rapid reuse of system components even when new specialized processors become available.

16 Claims, 5 Drawing Sheets

(56) References Cited

U.S. PATENT DOCUMENTS

| | | | |
|---|---|---|---|
| 2014/0205243 A1* | 7/2014 | Baker | H01R 31/005 385/77 |
| 2014/0369347 A1* | 12/2014 | Orsley | H04L 49/25 370/358 |
| 2015/0294434 A1* | 10/2015 | Nataros | G09G 5/363 345/520 |
| 2016/0227300 A1* | 8/2016 | Lai | H04Q 11/0005 |
| 2016/0292115 A1* | 10/2016 | Akhter | G06F 13/4027 |
| 2016/0342563 A1* | 11/2016 | Tomada | G06F 13/4027 |
| 2017/0127553 A1* | 5/2017 | White | G06F 11/0745 |
| 2017/0150621 A1* | 5/2017 | Breakstone | G06F 13/4022 |
| 2017/0308725 A1* | 10/2017 | Sardaryan | G06K 7/042 |

\* cited by examiner

HIGH-SPEED INTER-PROCESSOR COMMUNICATIONS

TECHNICAL FIELD

The disclosed technology relates generally to high-speed inter-processor communications with a flexible interconnect topology.

BACKGROUND

Clusters of computing devices including interconnected computer nodes are sometimes employed to process high-volume data or computation tasks. A computing cluster is a set of computing devices, e.g., configured as a computing network comprising multiple computing devices. Various data communications technologies have been deployed to enable the computing devices to exchange data, e.g., Ethernet, Fiberchannel, etc. However, these technologies generally exchange data more slowly than processors are able to process data. Different techniques to reduce interconnection overhead and latency have been tried on both software and hardware levels, but such techniques are limited by conventional system architectures of data pathways.

To improve performance, some computing devices have been designed to accommodate multiple processors. More recently, specialized processors (e.g., math processors, graphic processing units (GPUs), field programmable gate arrays, etc.) have been adapted for use with various computational processes. These specialized processors are referenced herein as "accelerators," but various terms are commonly used to refer to these types of processors. Typically, accelerators are used when intensive computation, typically parallel mathematical computation, is involved. However, current computational needs have outpaced even the capabilities of accelerators. Some computing devices can operate with multiple accelerators. However, accelerators can consume and generate data much more quickly than standard computing buses (e.g., Peripheral Component Interconnect Express, or "PCIe") and so standard interconnections between accelerators become bottlenecks. Moreover, interconnection topologies are fixed and cannot easily be changed to satisfy application requirements.

Figure 1:
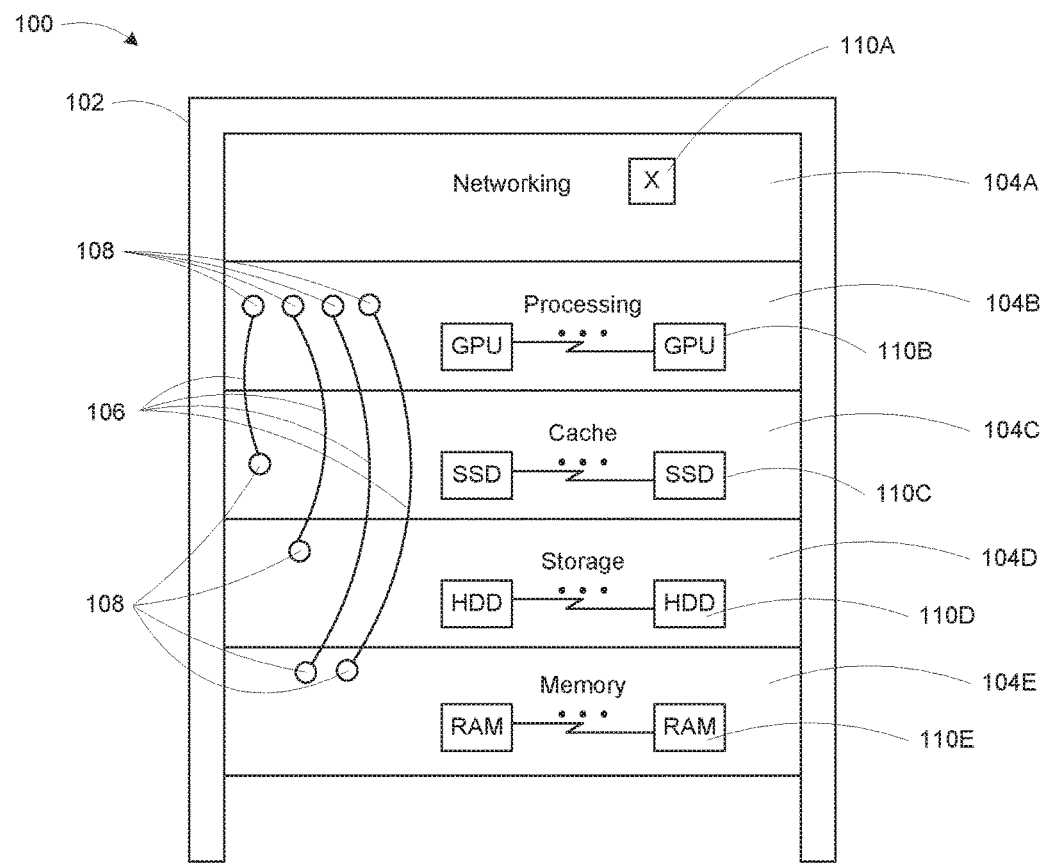
FIG. 1 is a block diagram illustrating an example of a computing environment employing multiple computing devices, consistent with various embodiments.

The figures depict various embodiments of the disclosed technology for purposes of illustration only. One skilled in the art will readily recognize from the following discussion that alternative embodiments may be employed.

DETAILED DESCRIPTION

Overview of Technology

A high-speed inter-processor communications architecture with a flexible interconnect topology is described. In various embodiments, the architecture includes a motherboard, multiple daughter boards, and "interconnections" or "interconnect ports" (e.g. ports, cables, printed circuit boards (PCBs), etc.) between the multiple daughter boards. The motherboard may include one or more conventional central processing units (CPUs) and multiple connectors (e.g. PCIe connectors). Each daughter board may occupy one of the connectors, and may employ it to exchange data and receive signaling information from other devices connected to the motherboard, e.g., a CPU. Each daughter board may include one or more accelerators, memory, and one or more interconnection ports per accelerator.

In various embodiments, each daughter board may include two, four, eight, or more interconnection ports per accelerator. In some implementations, a motherboard can have three or more attached daughter boards. One or more interconnection ports of a daughter board may be communicably connected via an interconnection cable or PCB to an interconnection port of a different daughter board. In so doing, one or more of the accelerators associated with each of the two interconnected daughter boards may be able to signal, exchange data, or share memory access with each other. Thus, the interconnection can form a mesh, fabric, or indeed any type of topology. A mesh topology exists when every accelerator is directly interconnected with every other accelerator. A fabric topology exists when some accelerators are interconnected with some other accelerators, but typically each accelerator can communicate with any other accelerator via at least one intermediate accelerator. In some implementations, each accelerator can communicate with any other accelerator via no more than one intermediate accelerator. In various implementations, this allows inter-processor communication across daughter boards to be flexible, configurable, or separate from PCIe connections with the motherboard.

In various embodiments, the accelerators may be manufactured by different manufacturers and daughter boards having accelerators from different manufacturers may or may not be capable of being directly connected or mixed on a motherboard. Typically, however, a computing device would only have daughter boards having accelerators manufactured by a common manufacturer or at least having a common standard.

In some embodiments, the interconnection ports and interconnection cables may use industry standard high speed communications standards, e.g., Quad Small Form-factor Pluggable (QSFP) connectors and cables. Even if standard interconnection ports and cables are used, different manufacturers may select different pinout configurations. In other embodiments, the interconnection ports and interconnection cables may be proprietary to the manufacturer of the accelerators associated with the daughter boards or some other manufacturer or product designer. In various embodiments, the interconnection ports can be on any location and in any direction of the daughter card.

An operator can interconnect the daughter boards in different configurations, e.g., to create different interconnection topologies. As an example, a topology may be selected based on the computing intensive application that the accelerators will function with. Machine learning is an example of a type of intensive computational process that benefits from the use of accelerators. Different machine learning algorithms exist. One such example is "deep learning." Deep learning involves several layers of nonlinear processing units (e.g., "neurons") that extract and transform "features"

in underlying data. Typically, these nonlinear processing units can operate independently and then share their results with other nonlinear processing units generally in a "higher" layer. Sometimes, nonlinear processing units may share results with other nonlinear processing units in the same (or even a "lower") layer. Embodiments of the architecture described above can be adapted for almost any type of machine learning algorithm. As an example, one or more computing devices may be assigned to each layer so that computations of a layer can be performed very quickly and intermediate results can be shared between accelerators on an as-needed basis. If the machine learning algorithm is modified, the topology can be easily changed without having to purchase and deploy new hardware. Moreover, if new accelerator designs become available and desirable, other portions of the computing devices do not need to be replaced. Thus, embodiments described herein enable a highly flexible topology architecture for interconnecting processors using high-speed communications links.

FIG. 1 is a block diagram illustrating an example of a computing environment 100 employing multiple computing devices, consistent with various embodiments. The computing environment 100 may sustain high bandwidth data sharing and processing. For example, the computing environment 100 may be a computing cluster, a server rack, or a server tray. As illustrated for example, the computing environment 100 may include a disaggregated rack 102. The disaggregated rack 102 can be a computer cluster in which functional elements of the computer cluster are separated into separate devices, e.g., a networking (e.g., input/output (IO) processing) device 104A, a processing device 104B, a cache device 104C, a storage device 104D, and a memory service device 104E (collectively referred to as the "computing devices 104").

The computing devices 104A-E may be a computer, e.g., computer server, server sled, computer tray, desktop computer, or other types of computers. Each of the computing devices 104 may include a processor (e.g., CPU), a motherboard and a volatile memory.

In various embodiments, interconnects 106 coupled to ports 108 may be a medium for inter-processor data transportation. The ports 108 may enable computing devices 104 to exchange data via various high-speed interconnects 106. The inter-processor interconnects 106 may be a bus or cable. The inter-processor interconnects 106 may be multi-lane or single lane and may transmit or receive data via optics, electric signals, electro-magnetic signals, or other means of data communication. In some embodiments, each of the computing devices 104 may also include a network card, e.g., an optical or Ethernet NIC (not illustrated). The network card may be connected via a peripheral component interconnect (PCI) bus on the computing device's motherboard. Conventional inter-device architectures may utilize the network card as a portal for inter-processor communication, where a cluster switch or router acts as a nexus for inter-processor communications. As an example, a computing device may employ the network card to communicate with various computing devices.

Disaggregation enables flexible allocation and/or re-allocation of system resources in the cluster computing environment 100 through customization of rack resources, and thus improving cluster scalability. For example, the networking device 104A may include one or more network components 110A (e.g., a switch or a network buffer); the processing device 104B may include one or more processor components (e.g., accelerators) 1106, the cache device 104C may include one or more cache memories 110C (e.g., solid state drives); the storage device 104D may include one or more persistent storage devices 110D (e.g., hard disks); and the memory service device 104E may include one or more random access memory modules 110E. The network components 110A, the processor components 110B, the cache memories 110C, the persistent storage devices 110D, and the random access memory modules 110E may be collectively referred to as "the resource components 110". Because the resource components 110 may serve the same client application, a same data set may be exchanged amongst multiple computing devices 104. Each of the resource components 110 can be independently serviced and/or upgraded, e.g., to suit the needs of applications the computing devices 104 may be configured to execute. As examples, a database application may receive faster storage devices 110D, a machine learning processing application may receive processor components 110B designed to speed up machine learning, and a web application may receive larger cache memories 110C.

Figure 2:
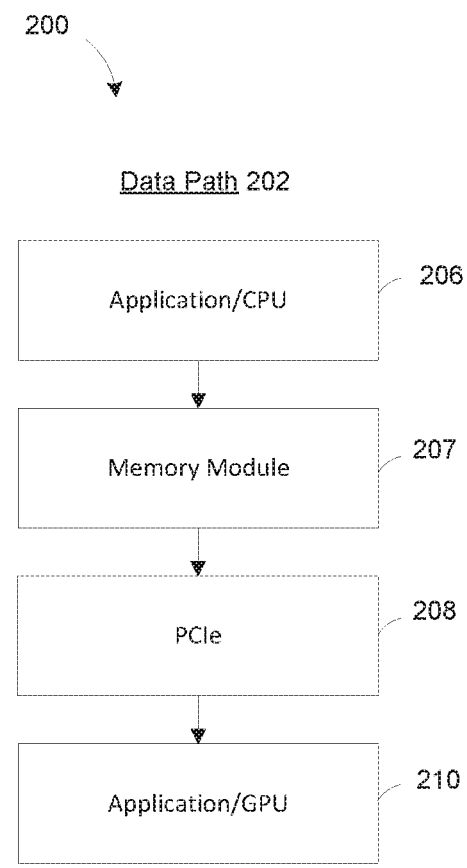
FIG. 2 is a data path diagram illustrating a conventional GPU architecture.

FIG. 2 is a data path diagram illustrating a conventional GPU architecture 200. In the conventional architecture 200, a conventional computing device executes an application using its CPU 206. The application 206 can then transfer data via a memory module 207. For example, the application 206 can move the data set to a region of memory. The GPU 210 may then receive a signal via the PCIe bus to retrieve the data from the memory module 207 and software executing on it may process the data. After processing the data, the process is reversed.

Figure 3:
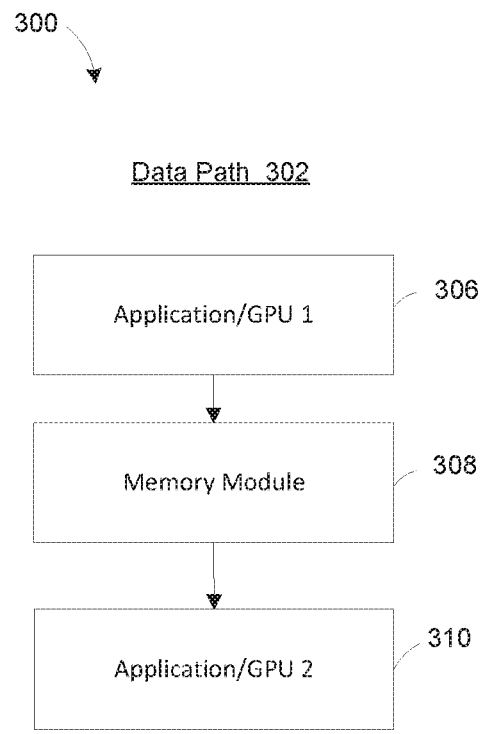
FIG. 3 is a data path diagram illustrating a memory channel data transport architecture, consistent with various embodiments.

FIG. 3 is a data path diagram illustrating an accelerator architecture 300, consistent with various embodiments. A computing device (e.g., one of the computing devices 104) can execute an application at a first accelerator 306. The application executed by the accelerator 306 can then directly access a memory module 308 that is on the same daughter board as the accelerator. A second accelerator 310, typically associated with a different daughter card in the same computing device but can be associated with the same daughter card as the first accelerator 306, can then access the data stored in the memory module 308. This access can occur via a high speed interconnect as described in detail above.

Thus, the high speed inter-processor communications architecture completely bypasses conventional modules. A comparison of FIG. 2 and FIG. 3 illustrates that the inter-processor communications architecture is advantageous at least because of the ability to reduce data processing latency because communications over interconnection ports and cables can occur at much higher speeds than was typical.

Figure 4:
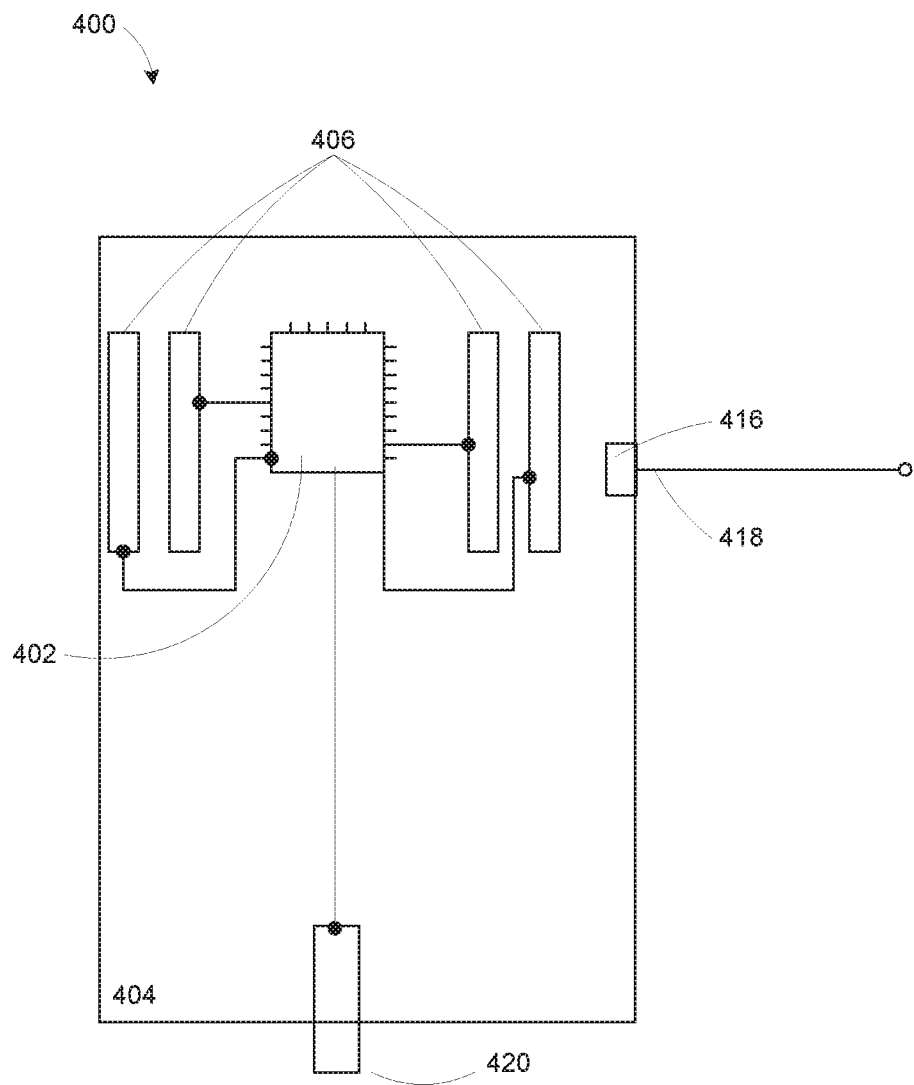
FIG. 4 is a block diagram illustrating a computing device implementing an inter-processor communications architecture, consistent with various embodiments.

FIG. 4 is a block diagram illustrating a daughter board environment 400 implementing an inter-processor communications architecture (e.g., the architecture 300), consistent with various embodiments. The daughter board 400 environment includes a daughter board 404. The daughter board 404 may comprise any rigid material including plastic, metal, alloy, carbon fiber, or any combination thereof. For example, the daughter board 404 may be a printed circuit board mountable on a mother board via a PCIe connector (not illustrated).

The daughter board 404 may include a specialized processor 402 (e.g., accelerator). The processor 402 can be coupled to one or more memory modules 406. In some implementations, processor 402 can include memory modules 406. In various embodiments, the processor 402 may act as a memory controller. In other embodiments, a separate component may be implemented as the memory controller.

In some embodiments, computing devices or daughter boards of computing devices are interconnected. A port 416 of a daughter card may be interconnected with other ports of the same or a different daughter card (not illustrated) via an inter-processor interconnects 418. The port 416 and interconnect 418 may conform with an industry standard, e.g., QSFP, or may be proprietary.

The daughter board 404 may also include one or more PCIe connectors 420. The PCIe connector 420 provides a data signal path for components and modules of the computing device (not illustrated) to communicate with the processor 402.

Figure 5:
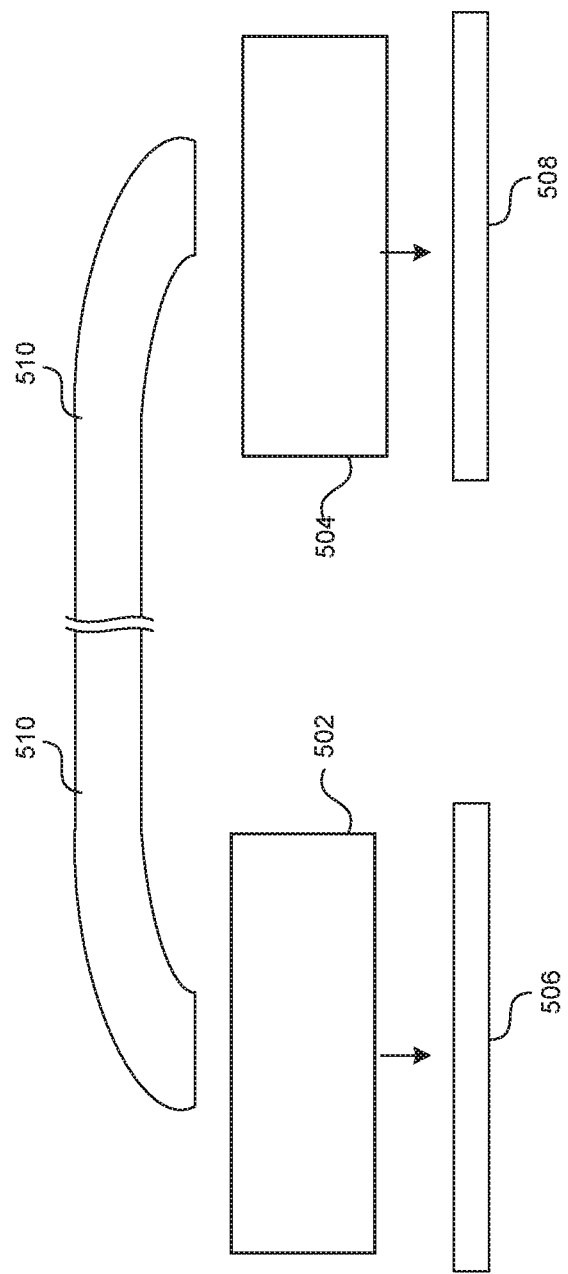
FIG. 5 is a block diagram illustrating interconnected daughter cards, consistent with various embodiments.

FIG. 5 is a block diagram illustrating interconnected daughter cards, consistent with various embodiments. As illustrated, a first daughter card 502 and a second daughter card 504 may each be interconnected via an inter-processor interconnect 510, e.g., the inter-processor interconnect 418. The daughter card 502 and the second daughter card 504 may communicate with other devices of their respective computing devices via PCIe connectors 506 and 508, respectively.

The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on the communications link. Various communications links may be used, such as the Internet, a local area network, a wide area network, or a point-to-point dial-up connection. Thus, the computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosed technology is not limited except as by the appended claims.

What is claimed is:

1. A computing device, comprising:
a motherboard having one or more central processing units;
at least three daughter boards communicably connected to the motherboard, including a first daughter board and a second daughter board, each of the at least three daughter boards having at least a specialized processor and a high-speed inter-processor communications port; and
at least two high-speed inter-processor communications interconnects connecting at least two of the high-speed inter-processor communications ports, including a high-speed inter-processor communications interconnect that connects a high-speed inter-processor communications port of the first daughter board with a second high-speed inter-processor communications port of the second daughter board, wherein:
the high-speed inter-processor communications ports and the high-speed inter-processor communications interconnects conform to an industry standard;
the industry standard is a QUAD SMALL FORM-FACTOR PLUGGABLE standard;
the at least two high-speed inter-processor communications interconnects comprise a first QUAD SMALL FORM-FACTOR PLUGGABLE cable and a second QUAD SMALL FORM-FACTOR PLUGGABLE cable; and
the specialized processor of the second daughter board is configured to directly access results of executing an application that are stored in a memory module of the first daughter board across the first QUAD SMALL FORM-FACTOR PLUGGABLE cable that directly connects the high-speed inter-processor communications port of the first daughter board with the second high-speed inter-processor communications port of the second daughter board such that a bottleneck of a data path through a network card connected to a standard interface is bypassed.

2. The computing device of claim 1, wherein the standard interface is a PERIPHERAL COMPUTING INTERCONNECT EXPRESS interface.

3. The computing device of claim 2, wherein the application comprises a machine learning processing application.

4. The computing device of claim 3, wherein the machine learning processing application comprises a deep learning application.

5. The computing device of claim 1, further comprising multiple additional daughter boards, each of the additional daughter boards having at least one specialized processor, wherein the additional daughter boards are interconnected in a first topology by interconnecting high-speed inter-processor communications cables in a first arrangement.

6. The computing device of claim 5, wherein the additional daughter boards and the three or more daughter boards are interconnected in a second topology by interconnecting high-speed inter-processor communications cables in a second arrangement.

7. The computing device of claim 1, wherein the daughter boards are adaptable for use with specialized processors from different manufacturers.

8. The computing device of claim 1, wherein the high-speed inter-processor communications port is adaptable for different pinout configurations.

9. A daughter board, comprising:
a specialized processor;
a high-speed inter-processor communications port connected to an additional high-speed inter-processor communications port of an additional daughter board through a high-speed inter-processor communications interconnect; and
a standard interface for communicably connecting with a motherboard, wherein:
the high-speed inter-processor communications port and the high-speed inter-processor communications interconnect conform to an industry standard;
the industry standard is a QUAD SMALL FORM-FACTOR PLUGGABLE standard such that the high-speed inter-processor communications interconnect comprises a QUAD SMALL FORM-FACTOR PLUGGABLE cable that directly connects the high-speed inter-processor communications port to the additional high-speed inter-processor communications port of the additional daughter board; and
the specialized processor is configured to directly access results of executing an application that are stored in a memory module of the additional daughter board across the high-speed inter-processor communications interconnect that connects the high-speed inter-processor communications port with the additional high-speed inter-processor communications port of the additional daughter board such that a bottleneck of a data path through a network card connected to the standard interface is bypassed.

10. The daughter board of claim 9, wherein the standard interface is a PERIPHERAL COMPUTING INTERCONNECT EXPRESS interface.

11. The daughter board of claim 9, wherein the daughter board is disposed within a computing device.

12. The daughter board of claim 9, wherein the specialized processor is a processor designed to handle math computations more quickly than a general purpose central processing unit.

13. The daughter board of claim 9, wherein the specialized processor is configured to access a first memory associated with the daughter board via a bus on the daughter board.

14. The daughter board of claim 9, wherein the application comprises a machine learning processing application.

15. The daughter board of claim 14, wherein the machine learning processing application comprises a deep learning application.

16. A method performed by a specialized processor, comprising:

receiving a signal to access a memory module;

determining whether the memory module to be accessed is associated with a second daughter board on which the specialized processor is attached or a first daughter board; and in an event the memory module to be accessed is associated with the first daughter board, directly accessing results of executing an application that are stored in the memory module of the first daughter board across a high-speed inter-processor communications interconnect comprising a QUAD SMALL FORM-FACTOR PLUGGABLE cable that directly connects a high-speed inter-processor communications port of the first daughter board with a second high-speed inter-processor communications port of the second daughter board such that a bottleneck of a data path through a network card connected to a standard interface is bypassed.

* * * * *